United States Patent
Fang et al.

(10) Patent No.: US 12,156,073 B2
(45) Date of Patent: Nov. 26, 2024

(54) METHOD AND APPARATUS FOR MONITORING PERFORMANCE

(71) Applicant: ZTE Corporation, Shenzhen (CN)

(72) Inventors: Jianmin Fang, Shenzhen (CN); Li Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 82 days.

(21) Appl. No.: 17/484,789

(22) Filed: Sep. 24, 2021

(65) Prior Publication Data

US 2022/0014964 A1     Jan. 13, 2022

Related U.S. Application Data

(63) Continuation of application No. PCT/CN2019/079711, filed on Mar. 26, 2019.

(51) Int. Cl.
    *H04W 28/02*     (2009.01)
    *H04L 43/062*     (2022.01)
    *H04W 24/10*     (2009.01)

(52) U.S. Cl.
    CPC ....... *H04W 28/0268* (2013.01); *H04L 43/062* (2013.01); *H04W 24/10* (2013.01); *H04W 28/0236* (2013.01)

(58) Field of Classification Search
    CPC ... H04L 43/06; H04L 43/062; H04L 43/0858; H04W 24/10; H04W 28/0236; H04W 28/0268; H04W 88/085; H04W 92/12
See application file for complete search history.

(56) References Cited

U.S. PATENT DOCUMENTS

| | | | |
|---|---|---|---|
| 2008/0267069 A1* | 10/2008 | Thielman | H04N 7/15 348/E7.083 |
| 2018/0213444 A1 | 7/2018 | Khawand et al. | |
| 2019/0215731 A1* | 7/2019 | Qiao | H04W 60/06 |

(Continued)

FOREIGN PATENT DOCUMENTS

| | | |
|---|---|---|
| CN | 102457399 A | 5/2012 |
| CN | 105743962 A | 7/2016 |

(Continued)

OTHER PUBLICATIONS

International Search Report and Written Opinion for International Patent Application No. PCT/CN2019/079711 dated Jun. 27, 2019; 9 pages.

(Continued)

*Primary Examiner* — Mansour Oveissi
(74) *Attorney, Agent, or Firm* — Crowell & Moring LLP

(57) ABSTRACT

A method and apparatus for performing and configuring a performance monitoring is disclosed. In one embodiment, a method for performing a performance monitoring by a wireless communication node of a wireless communication system, includes: receiving a first message from a core network of the wireless communication system; and performing a performance monitoring according to the first message, wherein the first message comprises performance control information of at least one corresponding service flow, wherein the performance control information comprises at least one of the following: a packet delay budget and at least one indicator.

18 Claims, 8 Drawing Sheets

(56) References Cited

U.S. PATENT DOCUMENTS

2019/0297634 A1   9/2019  Dai et al.
2020/0229023 A1*  7/2020  Ke ................... H04W 28/0268

FOREIGN PATENT DOCUMENTS

| CN | 108024294 A | 5/2018 |
| CN | 109314710 A | 2/2019 |
| CN | 109392023 A | 2/2019 |
| CN | 109412771 A | 3/2019 |
| KR | 20080094991 A | 10/2008 |
| WO | WO 2015/192317 A1 | 12/2015 |
| WO | WO 2018/202129 A1 | 11/2018 |
| WO | WO 2019/065617 A1 | 4/2019 |

OTHER PUBLICATIONS

Extended European Search Report for European Patent Application No. 19849531.9 dated Sep. 22, 2022, 9 pages.
Exam Report under Article 94(3) EPC for European Patent Application No. 19849531.9 dated May 15, 2024, 4 pages.
Chinese Office Action with English translation, Sep. 2, 2024, pp. 1-28, issued in Chinese Application No. 201980094754.9, State intellectual Property Office, Beijing, China.
Qualcomm Incorporated, Delay measurements for URLLC and MMTel, Feb. 25-Mar. 1, 2019, pp. 1-5, 3GPP TSG-RAN WG3 Meeting #103, R3-190194, Athens, Greece.

* cited by examiner

METHOD AND APPARATUS FOR MONITORING PERFORMANCE

RELATED APPLICATION

This application is a continuation application of the International PCT Application No. PCT/CN2019/079711, filed with the China National Intellectual Property Administration, PRC on Mar. 26, 2019, which is incorporated herein by reference in its entirety.

TECHNICAL FIELD

This disclosure relates generally to wireless communications and, more particularly, to a method and apparatus for monitoring performance during wireless communication.

BACKGROUND

With a continuous increasing of global smartphone users, mobile data usage and traffic will continue to grow. In New Radio (NR), a new type of quality of service (QoS) is introduced to meet a demand for delay-sensitive services, such as intelligent transportation systems, dispersed automatic manufacturing systems, etc. The new type of QoS introduced in NR has a high requirement in latency and data packets that are not transmitted within a predefined delay may be determined as discarded packets. However, a core network is unable to acquire a status of QoS flows received or transmitted on a base station side with respect to a preconfigured requirement, e.g., latency requirement, bit rate requirement, etc. Therefore, the core network is unable to implement solutions so as to improve performances of QoS flows on the base station side.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In New Radio (NR), a new type of quality of service (QoS) is introduced to meet a demand for delay-sensitive services, such as intelligent transportation systems, dispersed automatic manufacturing systems, etc. The new type of QoS introduced in NR has a high requirement in latency and data packets that are not transmitted within a predefined delay may be determined as discarded packets. However, a core network is unable to acquire a status of QoS flows received or transmitted on a base station side with respect to a preconfigured requirement, e.g., latency requirement, bit rate requirement, etc. Therefore, the core network is unable to implement solutions so as to improve performances of QoS flows on the base station side, e.g., a base station, a Uu interface, a F1 interface, a Central Unit of a base station, and a distributed unit of a base station. Therefore, there exists a need to develop a method and apparatus for monitoring performance on the base station side so as to control the performance of QoS flows in wireless communication, e.g., change priority levels and release QoS flows.

In one embodiment, a method for performing a performance monitoring by a wireless communication node of a wireless communication system, includes: receiving a first message from a core network of the wireless communication system; and performing a performance monitoring according to the first message, wherein the first message comprises performance control information of at least one corresponding service flow, wherein the performance control information comprises at least one of the following: a packet delay budget and at least one indicator.

In a further embodiment, a method for configuring a performance monitoring by a core network of a wireless communication system, includes: transmitting a first message to a wireless communication node of the wireless communication system, wherein the first message comprises performance control information of at least one corresponding service flow, wherein the performance control information comprises at least one of the following: a packet delay budget and at least one indicator, and wherein the performance control information is used by the wireless communication node for performing a performance monitoring.

Yet in another embodiment, a computing device comprising at least one processor and a memory coupled to the processor, the at least one processor configured to carry out the method.

Yet, in another embodiment, a non-transitory computer-readable medium having stored thereon computer-executable instructions for carrying out the method.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
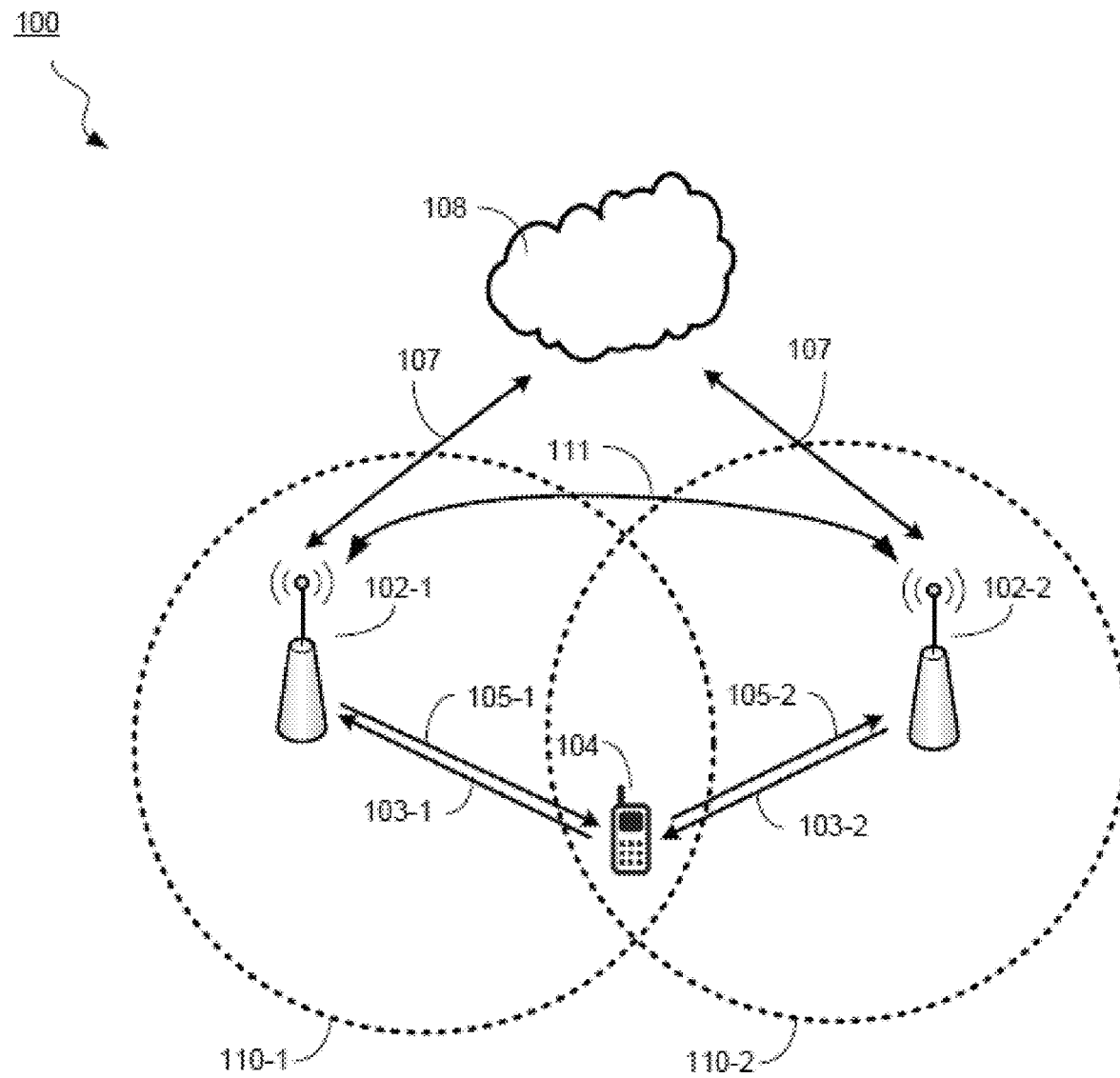
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) 102 can be a node B, an E-UTRA Node B (also known as Evolved Node B, eNodeB or eNB), a New Generation eNB (ng-eNB), a gNodeB (also known as gNB) in new radio (NR) technology, a pico station, a femto station, or the like. A terminal side communication device or a user equipment (UE) 104 can be a long range communication system like a mobile phone, a smart phone, a personal digital assistant (PDA), tablet, laptop computer, or a short range communication system such as, for example a wearable device, a vehicle with a vehicular communication system and the like. A network communication node and a terminal side communication device are represented by a BS 102 and a UE 104, respectively, and in all the embodiments in this disclosure hereafter, and are generally referred to as "communication nodes" and "communication device" herein. Such communication nodes and communication devices may be capable of wireless and/or wired communications, in accordance with various embodiments of the invention. A wireless communication system can further comprise a core network, which further comprises a plurality of network function (NF) entities. Hereinafter, the core network is represented by a CN 108. It is noted that all the embodiments are merely preferred examples, and are not intended to limit the present disclosure. Accordingly, it is understood that the system may include any desired combination of BSs 102 and UEs 104, while remaining within the scope of the present disclosure.

Referring to FIG. 1A, the wireless communication network 100 includes a first BS 102-1, a second BS 102-2, a UE 104, and a CN 108. In some embodiments, the UE 104 forms direct communication (i.e., uplink) channels 103-1, and 103-2, with the first BS 102-1, and the second BS 102-2, respectively. In some embodiments, the UE 104 also forms direct communication (i.e., downlink) channels 105-1, and 105-2 with the first BS 102-1, and the second BS 102-2, respectively.

In some embodiments, the CN 108 is a 5G Core Network (5GC). In some embodiments, the CN 108 further comprises at least one of the following network function (NF) entities: Access and Mobility Management Function (AMF), User Plane Function (UPF), and System Management Function (SMF). In some embodiments, the CN 108 further comprises Policy Control Function (PCF) and Unified Data Management (UDM). In some embodiments, the AMF supports at least one of the following: termination of Non-Access Stratum (NAS) signaling, NAS ciphering and integrity protection, registration management, connection management, mobility management, access authentication and authorization, and security context management. In some embodiments, the UPF supports at least one of the following: packet routing and forwarding, packet inspection, Quality of Service (QoS) handling, acts as external Protocol Data Unit (PDU) session point of interconnect to Data Network (DN), and is an anchor point for intra- and inter-Radio Access Technology (RAT) mobility. In some embodiments, the SMF supports at least one of the following: session management (session establishment, modification, and release), UE IP address allocation and management, Dynamic Host Configuration Protocol (DHCP) functions, termination of NAS signaling related to session management, Downlink (DL) data notification, and traffic steering configuration for UPF for proper traffic routing. In some embodiments, the PCF supports at least one of the following: unified policy framework, providing policy rules to Control Plane (CP) functions, and access subscription information for policy decisions in User Data Repository (UDR). In some embodiments, the UDM supports at least one of the following: generation of Authentication and Key Agreement (AKA) credentials, user identification handling, access authorization and subscription management. In some embodiments, the first CN 108-1 has a CP and User Plane (UP) split. In some embodiments, the UPF supports UP data processing and the AMF, SMF, PCF, and UDM act as CP functions.

The first BS 102-1 and the second BS 102-2 are directly connected to the CN 108 on a control plane (CP), i.e., an NG-C interface, and also connected to the CN 108 on a user plane (UP) through an external interface 107, i.e., an NG-U interface. When the first BS 102-1 and the second BS 102-2 each is one of the following: a gNB and an ng-eNB, the direct communication between the first BS 102-1 and the second BS 102-2 on the UP and CP is through an Xn-U interface and an Xn-C interface, respectively. A first serving cell 110-1 is covered by the first BS 102-1; and the second serving cell 110-2 is covered by the second BS 102-2. In some embodiments, the second cell 110-2 is a primary cell of the second BS 102-2, and the first cell 110-1 is a primary cell of the first BS 102-1. In some embodiments, the first cell 110-1 and the second cell 110-2 are neighboring cells.

In some embodiments, the first BS 102-1 and/or the second BS 102-2 is split into a Distributed Unit (DU) and a Central Unit (CU) on the UP, between which the direct communication is through a F1-U interface on the UP and a F1-C interface on the CP. In some embodiments, a CU of a BS 102 (e.g., the first BS 102-1 or the second BS 102-2) can be further split into a Control Plane (CP) and a User Plane (UP), between which (i.e., CU-CP and CU-UP) the direct communication is through an E1 interface. The direct communication channels between the UE 104 and a DU of the BS 102 can be through interfaces such as an Uu interface, which is also known as E-UTRAN air interface. In some embodiments, the UE 104 comprises a plurality of transceivers which enables the UE 104 to support multi connectivity so as to receive data simultaneously from the first BS 102-1, and the second BS 102-2.

Figure 1B:
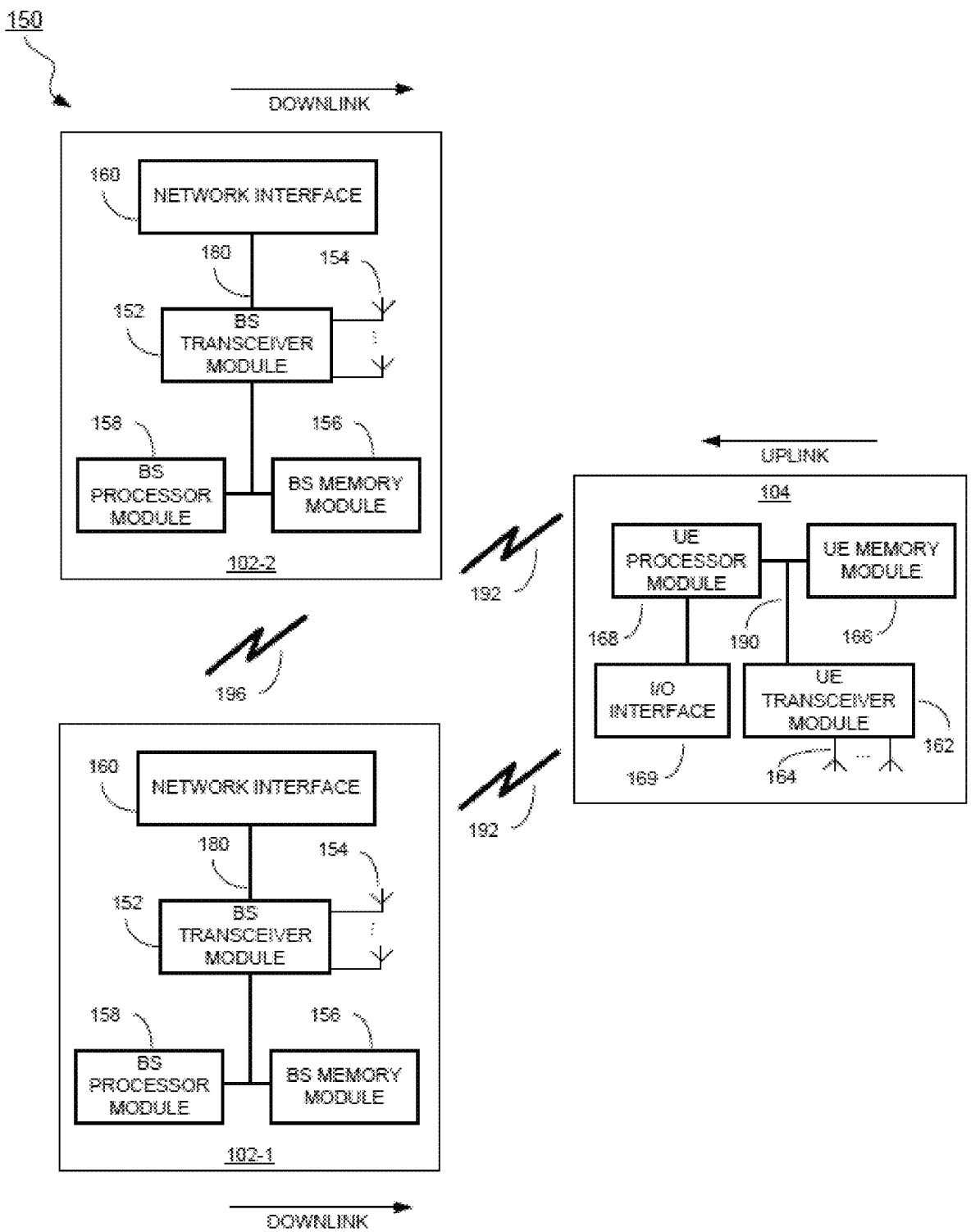
FIG. 1B illustrates a block diagram of an exemplary wireless communication system, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In some embodiments, the system 150 can be used to transmit and receive data symbols in a wireless communication environment such as the wireless communication network 100 of FIG. 1A, as described above.

The system 150 generally includes a first BS 102-1, a second BS 102-2, and a UE 104, collectively referred to as BS 102 and UE 104 below for ease of discussion. The first BS 102-1 and the second BS 102-2 each comprises a BS transceiver module 152, a BS antenna array 154, a BS memory module 156, a BS processor module 158, and a network interface 160. In the illustrated embodiment, each module of the BS 102 are coupled and interconnected with one another as necessary via a data communication bus 180. The UE 104 comprises a UE transceiver module 162, a UE antenna 164, a UE memory module 166, a UE processor module 168, and an I/O interface 169. In the illustrated embodiment, each module of the UE 104 are coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink (UL) transmission, and a wireless transmission from a transmitting antenna of the BS 102 to a receiving antenna of the UE 104 is known as a downlink (DL) transmission. In accordance with some embodiments, the UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192. The BS transceiver 152 communications through the BS antenna 154 of a BS (e.g., the first BS 102-1) with the other BS (e.g., the second BS 102-2) via a wireless communication channel 196. The wireless communication channel 196 can be any wireless channel or other medium known in the art suitable for direct communication between BSs.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some exemplary embodiments, the UE transceiver 162 and the BS transceiver 152 are configured to support industry standards such as the Long Term Evolution (LTE) and emerging 5G standards (e.g., NR), and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The processor modules 158 and 168 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor module may be realized as a microprocessor, a controller, a microcontroller, a state machine, or the like. A processor module may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively.

The memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or a CN over a wired or wireless connection.

Referring again to FIG. 1A, as mentioned above, the BS 102 repeatedly broadcasts system information associated with the BS 102 to one or more UEs 104 so as to allow the UEs 104 to access the network within the cells (e.g., 110-1 for the first BS 102-1 and 110-2 for the second BS 102-2) where the BS 102 is located, and in general, to operate properly within the cell. Plural information such as, for example, downlink and uplink cell bandwidths, downlink and uplink configuration, cell information, configuration for random access, etc., can be included in the system information, which will be discussed in further detail below. Typically, the BS 102 broadcasts a first signal carrying some major system information, for example, configuration of the cell 110 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192 (e.g., a PBCH). In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
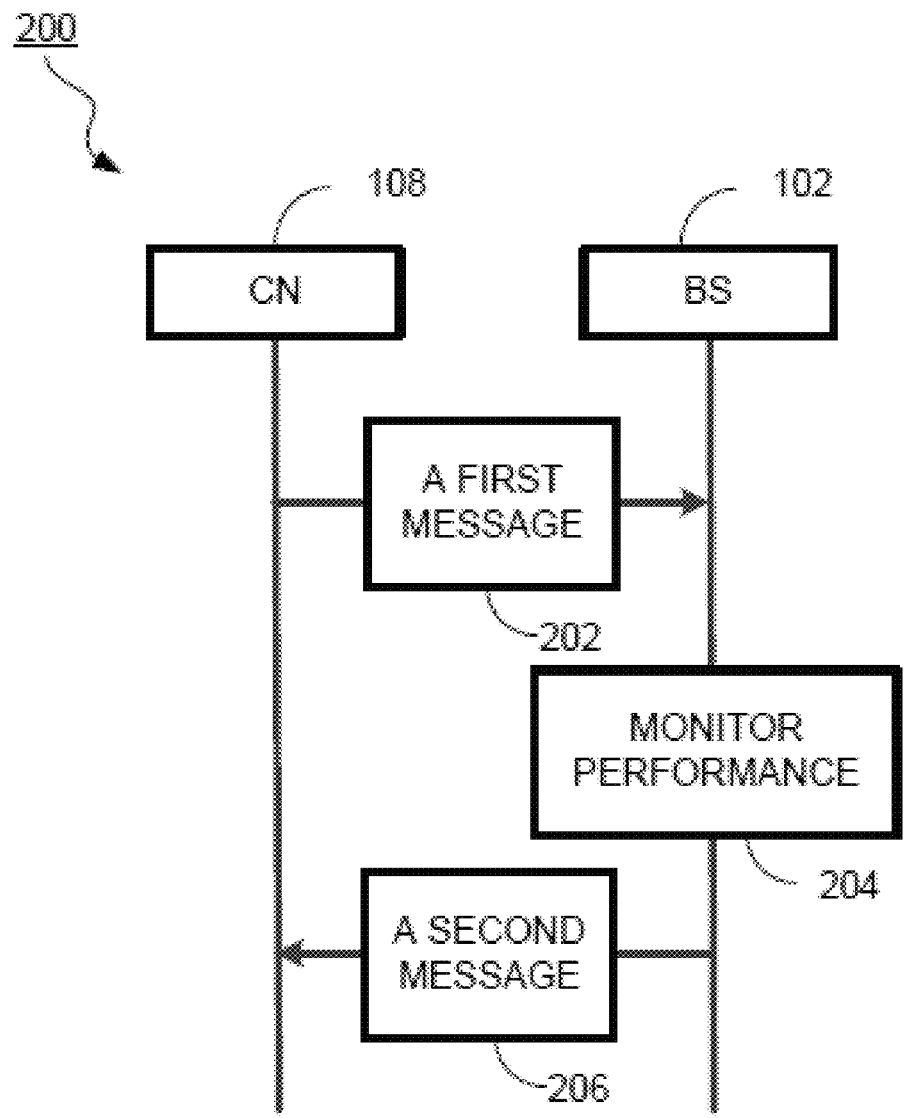
FIG. 2 illustrates a method for performing a performance monitoring in a wireless communication system, in accordance with some embodiments of the present disclosure.

FIG. 2 illustrates a method 200 for performing a performance monitoring in a wireless communication system, in accordance with some embodiments of the present disclosure. It is understood that additional operations may be provided before, during, and after the method 200 of FIG. 2, and that some operations may be omitted or reordered. The communication system in the illustrated embodiment comprises a BS 102, a CN 108 and a UE (not shown). In the illustrated embodiments, the BS 102 is one of the following: a gNB and an ng-eNB; and the CN 108 is a 5GC. FIG. 2 is for illustration purposes and is not intend to be limiting. It should be noted that that any numbers of BS 102 can be used, which is within the scope of this invention.

The method 200 starts with operation 202 in which a first message is received by the BS 102 from the CN 108 according to some embodiments. In some embodiments, the first message is transmitted on a NG interface. In some embodiments, the first message is transmitted from the CN 108 to the BS 102 through an AMF of the CN 108 through a NG-C interface. In some embodiments, the first message is one of the following: an INITIAL CONTEXT SETUP REQUEST message, a Protocol Data Unit (PDU) SESSION RESOURCE SETUP REQUEST message, and a PDU SESSION RESOURCE MODIFY REQUEST message. In some embodiments, the first message comprises performance control information for at least one Quality of Service (QoS) flow which requires performance control. In some embodiments, the performance control information comprises at least one of the following: a minimum flow bit rate, an additional averaging window list, a first indicator, and a second indicator. In some embodiments, the minimum flow bit rate is for a non-Guaranteed Bit Rate (GBR) service flow. In some embodiments, the additional average window list comprises a list of time intervals for monitoring performance. For example, the list of time intervals comprises 1, 3, 5, and 10 seconds. In some embodiments, the first indicator is an indicator for the BS 102 to report to the CN 108 an event when an actual flow bit rate is less than the minimum flow bit rate. In some embodiments, the second indicator is configured to indicate whether the list of time intervals can be used for monitoring performance.

The method 200 continues with operation 204 in which performance is monitored by the BS 102 according to some embodiments. In some embodiments, the performance is monitored according to the performance control information in the first message. In some embodiments, the performance is monitored by measuring at least one parameters, including an actual flow bit rate. In some embodiments, the performance is monitored according to a preconfigured averaging window. In some other embodiments, the performance is monitored according to the list of time intervals.

In some embodiments, when the second indicator has a value indicating the list of time intervals can be used for monitoring performance, the BS 102 can perform the performance monitoring at a time interval in the list or the preconfigured averaging window according to a current situation of the BS 102. For example, when the BS 102 is not busy, the preconfigured averaging window of 5 ms can be used by the BS 102; when the BS 102 is busy, a time interval (e.g., 10 ms or 20 ms) can be used by the BS 102.

The method 200 continues with operation 206 in which a second message is transmitted from the BS 102 to the CN 108 according to some embodiments. In some embodiments, the second message comprises a performance report of the at least one corresponding QoS flow. In some embodiments, the performance report is determined according to the first indicator in the performance control information. In some embodiments, the performance report in the second message comprises information of whether an actual flow bit rate is less than the minimum flow bit rate. In some embodiments, the second message is transmitted from the BS 102 to the AMF of the CN 108 through the NG-C interface. In some embodiments, the second message is a PDU SESSION RESOURCE NOTIFY message. In some embodiments, the performance report for the at least one QoS flow further comprises an actual averaging window used for performance monitoring. In some embodiments, the actual averaging window is determined according to the list of time intervals in the performance control information.

In some embodiments, the performance can be further adjusted by the CN according to the performance report received from the BS 102. For example, the CN 108 can perform one of the following: decrease a QoS requirement of the corresponding QoS flow, increase a priority of the corresponding QoS flow, and release the corresponding QoS flow.

Figure 3:
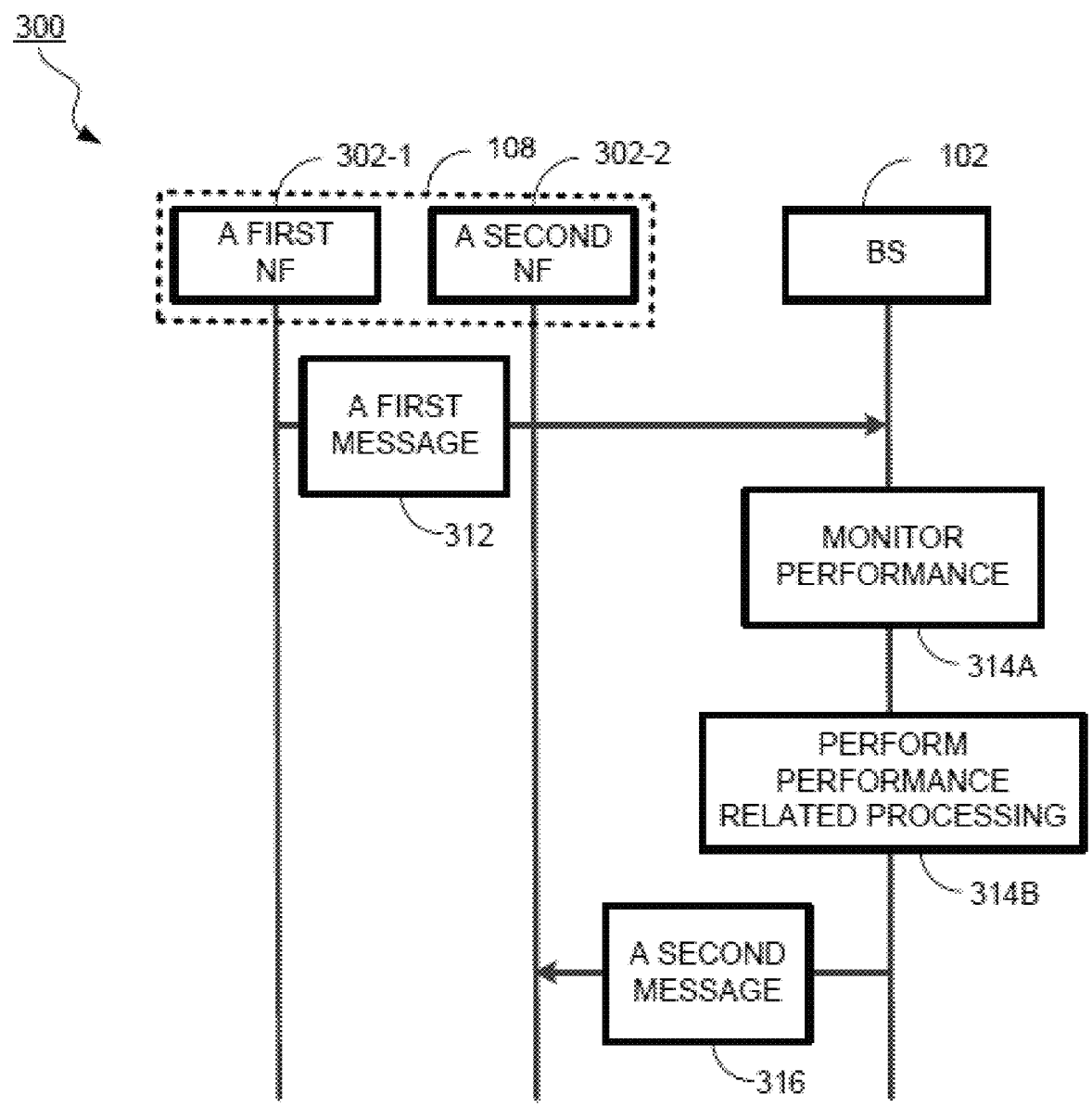
FIG. 3 illustrates a method for performing a performance monitoring in a wireless communication system, in accordance with some embodiments of the present disclosure.

FIG. 3 illustrates a method 300 for performing a performance monitoring in a wireless communication system, in accordance with some embodiments of the present disclosure. It is understood that additional operations may be provided before, during, and after the method 300 of FIG. 3, and that some operations may be omitted or reordered. The communication system in the illustrated embodiment comprises a CN 108 and a BS 102. In the illustrated embodiment, the CN 108 comprises a first NF entity 302-1, and a second NF entity 302-2. In some embodiments, the first node is an AMF of the CN 108 and the second node is a UPF of the CN 108. FIG. 3 is for illustration purposes and is not intend to be limiting. It should be noted that that any numbers of BS 102 can be used, which is within the scope of this invention.

The method 300 starts with operation 312 in which a first message is received by the BS 102 from the CN 108 according to some embodiments. In some embodiments, the first message is transmitted on a NG interface. In some embodiments, the first message is transmitted from the CN 108 to the BS 102 through an AMF of the CN 108 through an NG-C interface. In some embodiments, the first message is one of the following: an INITIAL CONTEXT SETUP REQUEST message, a Protocol Data Unit (PDU) SESSION RESOURCE SETUP REQUEST message, and a PDU SESSION RESOURCE MODIFY REQUEST message. In some embodiments, the first message comprises performance control information for at least one Quality of Service (QoS) flow which is required for performance monitoring. In some embodiments, the performance control information in the first message comprises at least one of the following: a packet delay budget, a first indicator, a second indicator, and a third indicator. In some embodiments, the packet delay budget is a delay time for transmitting data packets at corresponding interfaces and/or corresponding nodes. In some embodiments, the first indicator is an indicator for reporting when an actual packet delay for transmitting a corresponding data packet at a corresponding interface is greater than the packet delay budget of the corresponding interfaces and/or the corresponding nodes. In some embodiments, the second indicator is an indicator to drop the corresponding data packet when the actual packet delay is greater than the packet delay budget. In some embodiments, the third indicator is configured to indicate the corresponding interfaces and/or the corresponding nodes for performance monitoring. For example, the third indicator has an enumeration with values such as, "RAN part", "Uu interface", "gNB", and "UE", indicating the corresponding interfaces and/or the corresponding nodes.

The method 300 continues with operation 314A in which performance is monitored by the BS 102 according to some embodiments. In some embodiments, the performance is monitored according to the performance control information in the first message. For example, when the first indicator has a value indicating to report when an actual packet delay for transmitting a corresponding data packet at a corresponding interface is greater than the packet delay budget of the corresponding interface, and when the third indicator has a value of "Uu interface", the data packet delay of the Uu interface between the BS 102 and a UE (not shown) can be monitored by the BS 102.

In some embodiments, the method 300 may further continue with operation 314B in which performance-related processing is performed by the BS 102 according to some embodiments. In some embodiments, the performance-related processing is determined according to the second indicator and the third indicator in the performance control information. For example, when the second indicator has a value indicating to drop the corresponding data packet which has an actual packet delay greater than the packet delay budget, and when the third indicator has a value of "Uu interface", the BS 102 can drop the corresponding data packet when the actual packet delay of the Uu interface is greater than the packet delay budget.

The method 300 continues with operation 318 in which a second message is transmitted from the BS 102 to the CN 108 according to some embodiments. In some embodiments, the second message comprises a performance report of the at least one corresponding QoS flow. In some embodiments, the performance report is determined according to the first indicator, the second indicator, and the third indicator in the performance control information. In some embodiments, the performance report comprises at least one performance situation. For example the performance situation comprises whether an actual packet delay of a corresponding QoS flow at corresponding interfaces and/or corresponding nodes is greater than the packet delay budget. In some embodiments, the second message is transmitted from the BS 102 to the second node 302-2 of the CN 108 through the NG-U interface. In some embodiments, the second message is carried in a frame header of a data packet. In some embodiments, a format of the frame header comprises at least one bit and each of the at least one bit indicates a performance situation. For example, when a value of a bit in the frame header is 1, the actual packet delay of the corresponding QoS flow at the corresponding interfaces and/or the corresponding nodes is greater than the packet delay budget; and when a value of the bit of the frame header is 0, the actual packet delay of the corresponding QoS flow at the corresponding interfaces and/or the corresponding nodes is less than the configured packet delay budget.

In some embodiments, the performance can be further adjusted by the CN according to the performance report received from the BS 102. For example, the CN 108 can perform one of the following: decrease a QoS requirement of the corresponding QoS flow, increase a priority of the corresponding QoS flow, and release the corresponding QoS flow.

Figure 4:
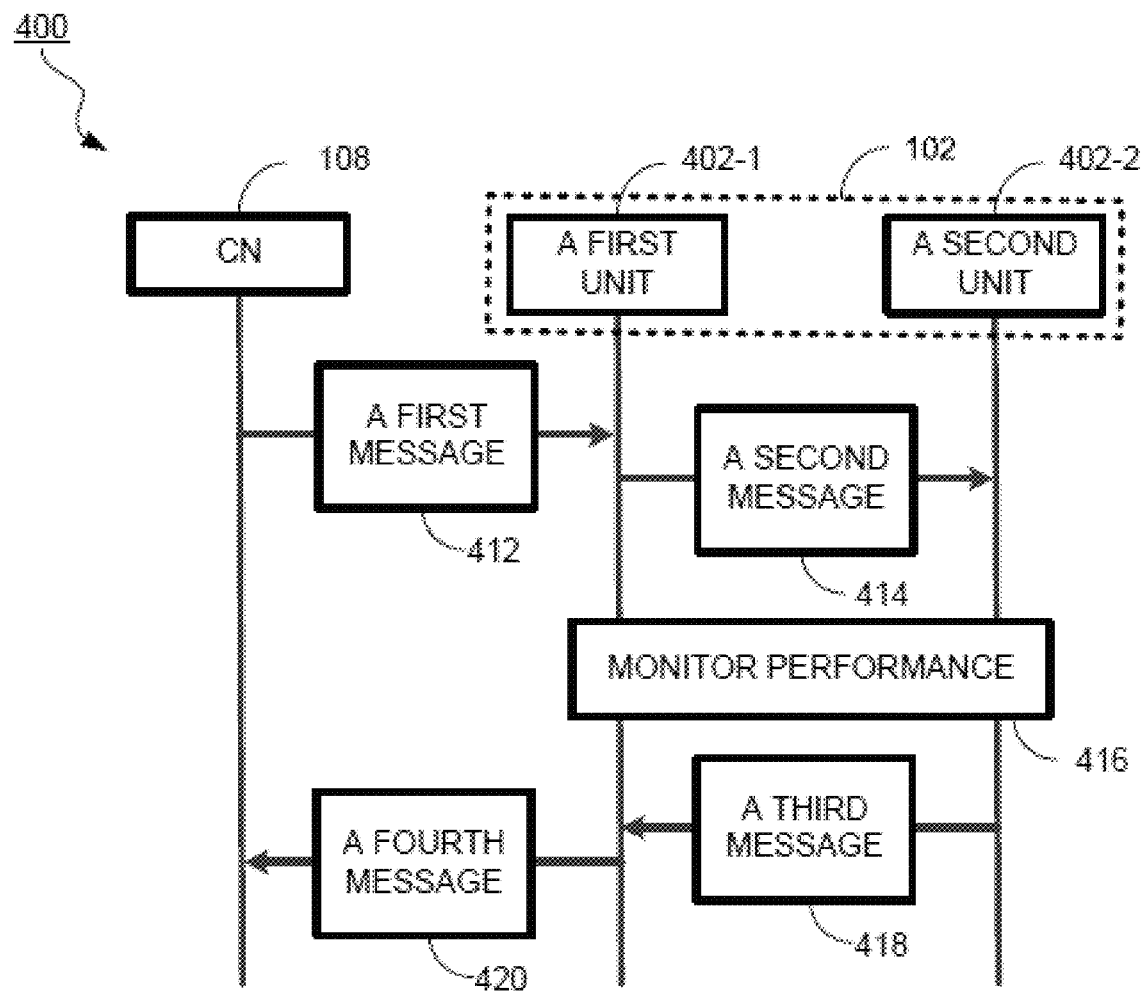
FIG. 4 illustrates a method for performing a performance monitoring in a wireless communication system, in accordance with some embodiments of the present disclosure.

FIG. 4 illustrates a method 400 for performing a performance monitoring in a wireless communication system, in accordance with some embodiments of the present disclosure. It is understood that additional operations may be provided before, during, and after the method 400 of FIG. 4, and that some operations may be omitted or reordered. The communication system in the illustrated embodiment comprises a CN 108 and a BS 102. In the illustrated embodiment, the BS 102 comprises a first unit 402-1, and a second unit 402-2. In some embodiments, the first unit 402-1 is a CU and a second unit 402-2 is a DU of the BS 102. FIG. 4 is for illustration purposes and is not intend to be limiting. It should be noted that that any numbers of BS 102 can be used, which is within the scope of this invention.

The method 400 starts with operation 412 in which a first message is received by the BS 102 from the CN 108 according to some embodiments. In some embodiments, the first message is transmitted on a NG interface. In some embodiments, the first message is transmitted from an AMF of the CN 108 to the first unit 402-1 of the BS 102. In some embodiments, the first message is one of the following: an INITIAL CONTEXT SETUP REQUEST message, a Protocol Data Unit (PDU) SESSION RESOURCE SETUP REQUEST message, and a PDU SESSION RESOURCE MODIFY REQUEST message. In some embodiments, the first message comprises performance control information for at least one Quality of Service (QoS) flow which requires performance control. In some embodiments, the performance control information comprises at least one of the following: a minimum flow bit rate, an additional averaging window list, a first indicator, and a second indicator. In some embodiments, the minimum flow bit rate is for a non-GBR service flow. In some embodiments, the additional average window list comprises a list of time intervals for monitoring performance. For example, the list of time intervals comprises 1, 3, 5, and 10 seconds. In some embodiments, the first indicator is an indicator for the BS 102 to report a performance situation to the CN 108 when an actual flow bit rate is less than the minimum flow bit rate. In some embodiments, the second indicator is configured to indicate whether the list of time intervals can be used for monitoring performance.

In some embodiments, when the second indicator has a value indicating the list of time intervals can be used for monitoring performance, the BS 102 can perform the performance monitoring at a time interval in the list or the preconfigured averaging window according to a current situation of the BS 102. For example, when the BS 102 is not busy, the preconfigured averaging window of 5 ms can be used by the BS 102; when the BS 102 is busy, a time interval (e.g., 10 ms or 20 ms) can be used by the BS 102.

The method 400 continues with operation 414 in which a second message is received by the second unit 402-2 of the BS 102 from the first unit 402-1 of the BS 102 according to some embodiments. In some embodiments, the second message is one of the following: a UE CONTEXT SETUP REQUEST message and a UE CONTEXT MODIFICATION REQUEST message. In some embodiments, the second message is transmitted through an F1-C interface. In some embodiments, the second message comprises the performance control information received by the first unit 402-1 of the BS 102 from the CN 108.

The method 400 continues with operation 416 in which performance is monitored by the second unit 402-2 of the BS 102 according to some embodiments. In some embodiments, the performance is monitored according to the performance control information in the first message. In some embodiments, the performance is monitored by the first unit 402-1 and the second unit 402-2 according to a preconfigured averaging window. In some other embodiments, the performance is monitored by the first unit 402-1 and the second unit 402-2 according to the list of time intervals in the additional average window list.

The method 400 continues with operation 418 in which a third message is transmitted from the second unit 402-2 of the BS 102 to the first unit 402-1 of the BS 102 according to some embodiments. In some embodiments, the third message is a NOTIFY message. In some embodiments, the third message is transmitted through a F1-C interface. In some embodiments, the third message comprises a first performance report of the at least one QoS flows determined by the second unit 402-2 of the BS 102. In some embodiments, the first performance report comprises a performance situation when an actual flow bit rate is less than the minimum flow bit rate. In some embodiments, the first performance report of the corresponding QoS flows further comprises an actual averaging window used for performance monitoring. In some embodiments, the actual averaging window is determined according to the list of time intervals in the performance control information.

The method 400 continues with operation 420 in which a fourth message is transmitted from the first unit 402-1 of the BS 102 to the CN 108 according to some embodiments. In some embodiments, the fourth message is a PDU SESSION RESOURCE NOTIFY message. In some embodiments, the fourth message is transmitted through a NG-C interface. In some embodiments, the fourth message comprises the first performance report received in the third message. In some embodiments, the fourth message further comprises a second performance report determined by the first unit 402-1 of the BS 102. In some embodiments, the second performance report comprises a performance situation when an actual flow bit rate is less than the minimum flow bit rate. In some embodiments, the second performance report of the corresponding QoS flows further comprises an actual averaging window used for performance monitoring. In some embodiments, the actual averaging window is determined according to the list of time intervals in the performance control information.

In some embodiments, the performance can be further adjusted by the CN according to the performance report received from the BS 102. For example, the CN 108 can perform one of the following: decrease a QoS requirement of the corresponding QoS flow, increase a priority of the corresponding QoS flow, and release the corresponding QoS flow.

Figure 5:
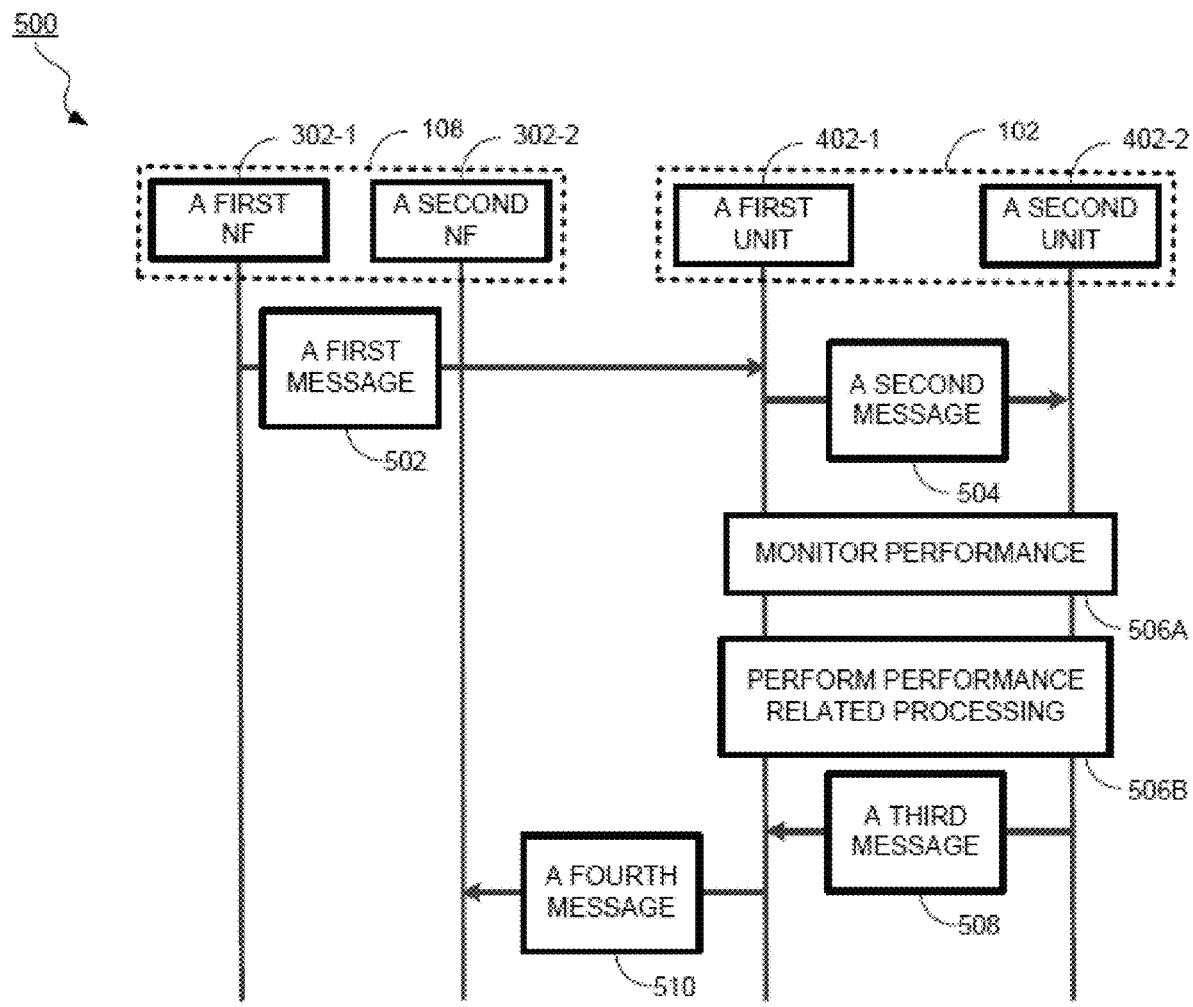
FIG. 5 illustrates a method for performing a performance monitoring in a wireless communication system, in accordance with some embodiments of the present disclosure.

FIG. 5 illustrates a method 500 for performing a performance monitoring in a wireless communication system, in accordance with some embodiments of the present disclosure. It is understood that additional operations may be provided before, during, and after the method 500 of FIG. 5, and that some operations may be omitted or reordered. The communication system in the illustrated embodiment comprises a CN 108 and a BS 102. In the illustrated embodiment, the CN 108 comprises a first NF entity 302-1, and a second NF entity 302-2. In some embodiments, the first NF entity 302-1 is AMF of the CN 108 and the second NF entity 302-2 is UPF of the CN 108. In the illustrated embodiment, the BS 102 comprises a first unit 402-1, and a second unit 402-2. In some embodiments, the first unit 402-1 is a CU and a second unit 402-2 is a DU. FIG. 5 is for illustration purposes and is not intend to be limiting. It should be noted that that any numbers of BS 102 and DU 402-2 can be used, which is within the scope of this invention.

The method 500 starts with operation 502 in which a first message is received by the first unit 402-1 of the BS 102 from the first NF entity 302-1 of the CN 108 according to some embodiments. In some embodiments, the first message is transmitted on a NG interface. In some embodiments, the first message is one of the following: an INITIAL CON- TEXT SETUP REQUEST message, a Protocol Data Unit (PDU) SESSION RESOURCE SETUP REQUEST message, and a PDU SESSION RESOURCE MODIFY REQUEST message. In some embodiments, the first message comprises performance control information for at least one Quality of Service (QoS) flow which requires performance control. In some embodiments, the performance control information comprises at least one of the following: a packet delay budget, a first indicator, a second indicator, and a third indicator. In some embodiments, the packet delay budget is a delay time for transmitting data packets at a corresponding interface. In some embodiments, the first indicator is an indicator for reporting a performance situation when an actual packet delay of a corresponding data packet is greater than the packet delay budget. In some embodiments, the second indicator is an indicator to drop the corresponding data packet if the actual packet delay is greater than the packet delay budget. In some embodiments, the third indicator is configured to indicate a corresponding interface for performing the performance monitoring. For example, the third indicator has an enumeration with a value of "Uu interface".

The method 500 continues with operation 504 in which a second message is received by the second unit 402-2 of the BS 102 from the first unit 402-1 of the BS 102 according to some embodiments. In some embodiments, the second message is one of the following: a UE CONTEXT SETUP REQUEST message and a UE CONTEXT MODIFICATION REQUEST message. In some embodiments, the second message is transmitted through an F1-C interface. In some embodiments, the second message comprises the performance control information received by the first unit 402-1 of the BS 102 from the first NF entity 302-1 of the CN 108.

The method 500 continues with operation 506A in which performance is monitored by the BS 102 according to some embodiments. In some embodiments, the performance is monitored by the first unit 402-1 and the second unit 402-2 of the BS 102 according to the performance control information in the first message. For example, when the first indicator has a value indicating to report a performance situation when an actual packet delay for transmitting a corresponding data packet at a corresponding interface is greater than the packet delay budget of the corresponding interface, and when the third indicator has a value of "Uu interface", the data packet delay of the Uu interface between the BS 102 and a UE (not shown) can be monitored by the BS 102.

In some embodiments, the method 500 may further continue with operation 506B in which performance-related processing is performed by the BS 102 according to some embodiments. For example, when the second indicator has a value indicating to drop the corresponding data packet which has an actual packet delay greater than the packet delay budget, and when the third indicator has a value of "RAN part", the BS 102 can drop the corresponding data packet when the actual packet delay is greater than the packet delay budget. In this case, the actual packet delay comprises the following: a processing delay in the BS 102, a transmission delay at the Uu interface, and a processing delay in the UE 104; and the value of "RAN part" of the third indicator indicates all the interfaces and nodes of the BS 102.

The method 500 continues with operation 508 in which a third message is transmitted from the second unit 402-2 of the BS 102 to the first unit 402-1 of the BS 102 according to some embodiments. In some embodiments, the third message is carried in the frame header of a UL packet through the F1-U interface. In some embodiments, the third message comprises a first performance report of the corresponding QoS flows. In some embodiments, the first performance report comprises at least one performance situation determined by the second unit 402-2 of the BS 102. For example the performance situation comprises whether an actual packet delay of a corresponding QoS flow at corresponding interfaces and/or corresponding nodes is greater than the packet delay budget.

The method 500 continues with operation 510 in which a fourth message is transmitted from the first unit 402-1 of the BS 102 to the second NF entity of the CN 108 according to some embodiments. In some embodiments, the fourth message is carried in a frame header of a data packet. In some embodiments, the fourth message is transmitted through a NG-U interface. In some embodiments, the fourth message comprises a second performance report, wherein the second performance report comprises at least one performance situation determined by the first unit 402-1 of the BS 102. In some embodiments, the fourth message further comprises the first performance report received in the third message. In some embodiments, the first performance report and the second performance report are transmitted in a frame header of a data packet. In some embodiments, a format of the frame header comprises at least one bit and each of the at least one bit indicates one type of performance situation. For example, when a value of a bit in the frame header is 1, the actual packet delay of the corresponding QoS flow at the corresponding interfaces and/or the corresponding nodes is greater than the packet delay budget; and when a value of the bit of the frame header is 0, the actual packet delay of the corresponding QoS flow at the corresponding interfaces and/or corresponding nodes is less than the configured packet delay budget.

In some embodiments, the performance can be further adjusted by the CN according to the performance report received from the BS 102. For example, the CN 108 can perform one of the following: decrease a QoS requirement of the corresponding QoS flow, increase a priority of the corresponding QoS flow, and release the corresponding QoS flow.

Figure 6:
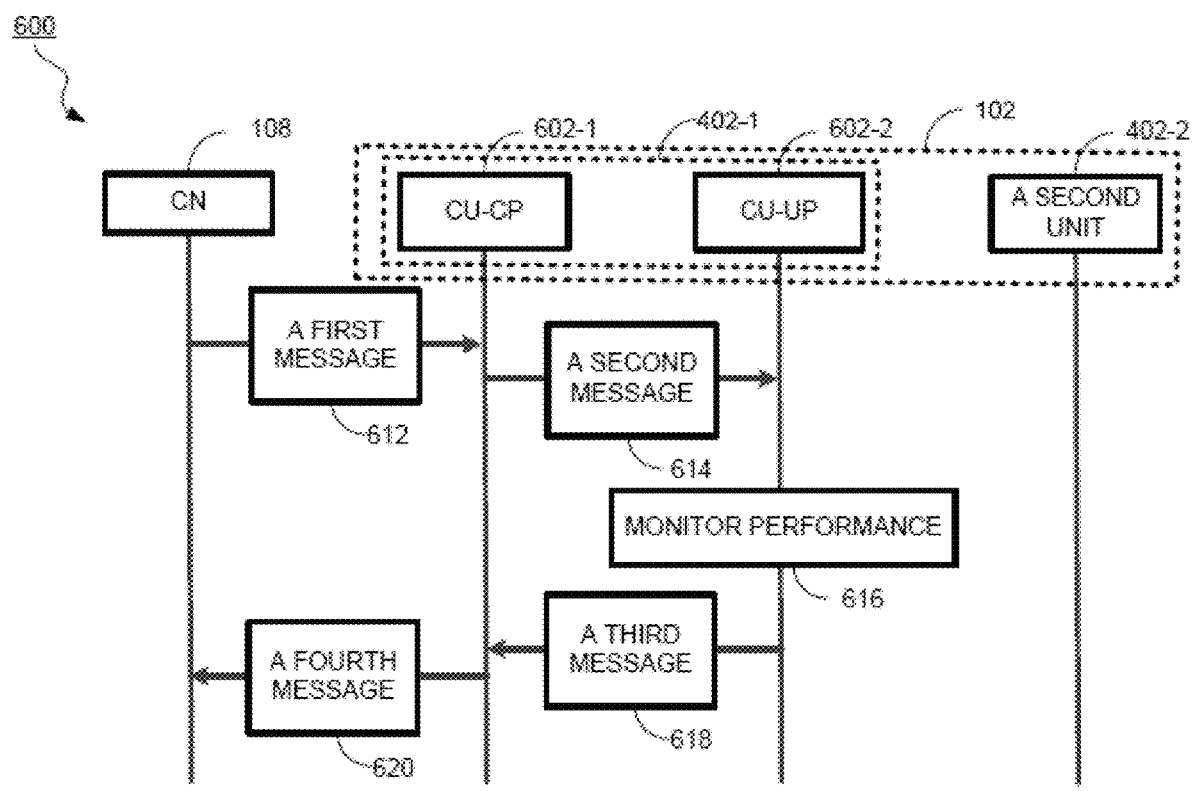
FIG. 6 illustrates a method for performing a performance monitoring in a wireless communication system, in accordance with some embodiments of the present disclosure.

FIG. 6 illustrates a method 600 for performing a performance monitoring in a wireless communication system, in accordance with some embodiments of the present disclosure. It is understood that additional operations may be provided before, during, and after the method 600 of FIG. 6, and that some operations may be omitted or reordered. The communication system in the illustrated embodiment comprises a CN 108 and a BS 102. In the illustrated embodiment, the BS 102 comprises a first unit 402-1, and a second unit 402-2. In some embodiments, the first unit 402-1 is a CU and a second unit 402-2 is a DU. In the illustrated embodiments, the first unit 402-1 is further split into a CU-Control Plane (CU-CP) 602-1 and a CU-User Plane (CU-UP) 602-2. FIG. 4 is for illustration purposes and is not intend to be limiting. It should be noted that that any numbers of BS 102 or any numbers of CU 602-1 can be used, which is within the scope of this invention.

The method 600 starts with operation 612 in which a first message is received by the BS 102 from the CN 108 according to some embodiments. In some embodiments, the first message is transmitted on a NG interface. In some embodiments, the first message is transmitted from an AMF of the CN 108 to the CU-CP 602-1 of the first unit 402-1 of the BS 102. In some embodiments, the first message is one of the following: an INITIAL CONTEXT SETUP REQUEST message, a Protocol Data Unit (PDU) SESSION RESOURCE SETUP REQUEST message, and a PDU SESSION RESOURCE MODIFY REQUEST message. In some embodiments, the first message comprises performance control information for at least one Quality of Service (QoS) flow which requires performance control. In some embodiments, the performance control information comprises at least one of the following: a minimum flow bit rate, an additional averaging window list, a first indicator, and a second indicator. In some embodiments, the minimum flow bit rate is for a non-GBR QoS flow. In some embodiments, the additional average window list comprises a list of time intervals for monitoring performance. For example, the list of time intervals comprises 1, 3, 5, and 10 seconds. In some embodiments, the first indicator is an indicator for the BS 102 to report to the CN 108 a performance situation when an actual flow bit rate is less than the minimum flow bit rate. In some embodiments, the second indicator is configured to indicate whether the list of time intervals can be used for monitoring performance.

In some embodiments, when the second indicator has a value indicating the list of time intervals can be used for monitoring performance, the BS 102 can perform the performance monitoring at a time interval in the list or the preconfigured averaging window according to a current situation of the BS 102. For example, when the BS 102 is not busy, the preconfigured averaging window of 5 ms can be used by the BS 102; when the BS 102 is busy, a time interval (e.g., 10 ms or 20 ms) can be used by the BS 102.

The method 600 continues with operation 614 in which a second message is received by the CU-UP 602-2 of the first unit 402-1 of the BS 102 from the CU-CP 602-1 of the first unit 402-1 of the BS 102 according to some embodiments. In some embodiments, the second message is one of the following: a BEARER CONTEXT SETUP REQUEST message, and a BEARER CONTEXT MODIFICATION REQUEST message. In some embodiments, the second message is transmitted through an E1 interface. In some embodiments, the second message comprises the performance control information received by the CU-CP 602-1 of the first unit 402-1 of the BS 102 from the CN 108.

The method 600 continues with operation 616 in which performance is monitored by the CU-UP 602-2 of the first unit 402-1 of the BS 102 according to some embodiments. In some embodiments, the performance is monitored according to the performance control information in the first message. In some embodiments, the performance is monitored by the CU-UP 62-2 of the first unit 402-1 of the BS 102 according to a preconfigured averaging window. In some other embodiments, the performance is monitored by the CU-UP 62-2 of the first unit 402-1 of the BS 102 according to the list of time intervals.

The method 600 continues with operation 618 in which a third message is transmitted from the CU-UP 602-2 of the first unit 402-1 of the BS 102 to the CU-CP 602-1 of the first unit 402-1 of the BS 102 according to some embodiments. In some embodiments, the third message is a NOTIFY message. In some embodiments, the third message comprises a performance report of the corresponding QoS flow. In some embodiments, the performance report comprises at least one performance situation determined according to the first indicator. For example, the at least one performance situation comprises when an actual flow bit rate is less than the minimum flow bit rate. In some embodiments, the third message is transmitted through the E1 interface. In some embodiments, the performance report of the corresponding QoS flow further comprises an actual averaging window used for performance monitoring. In some embodiments, the actual averaging window is determined according to the list of time intervals in the performance control information.

The method 600 continues with operation 620 in which a fourth message is transmitted from the CU-CP 602-1 of the first unit 402-1 of the BS 102 to the CN 108 according to some embodiments. In some embodiments, the fourth message is a PDU SESSION RESOURCE NOTIFY message. In some embodiments, the fourth message is transmitted through a NG-C interface. In some embodiments, the fourth message comprises the performance report received in the third message.

In some embodiments, the performance can be further adjusted by the CN according to the performance report received from the BS 102. For example, the CN 108 can perform one of the following: decrease a QoS requirement of the corresponding QoS flow, increase a priority of the corresponding QoS flow, and release the corresponding QoS flow.

Figure 7:
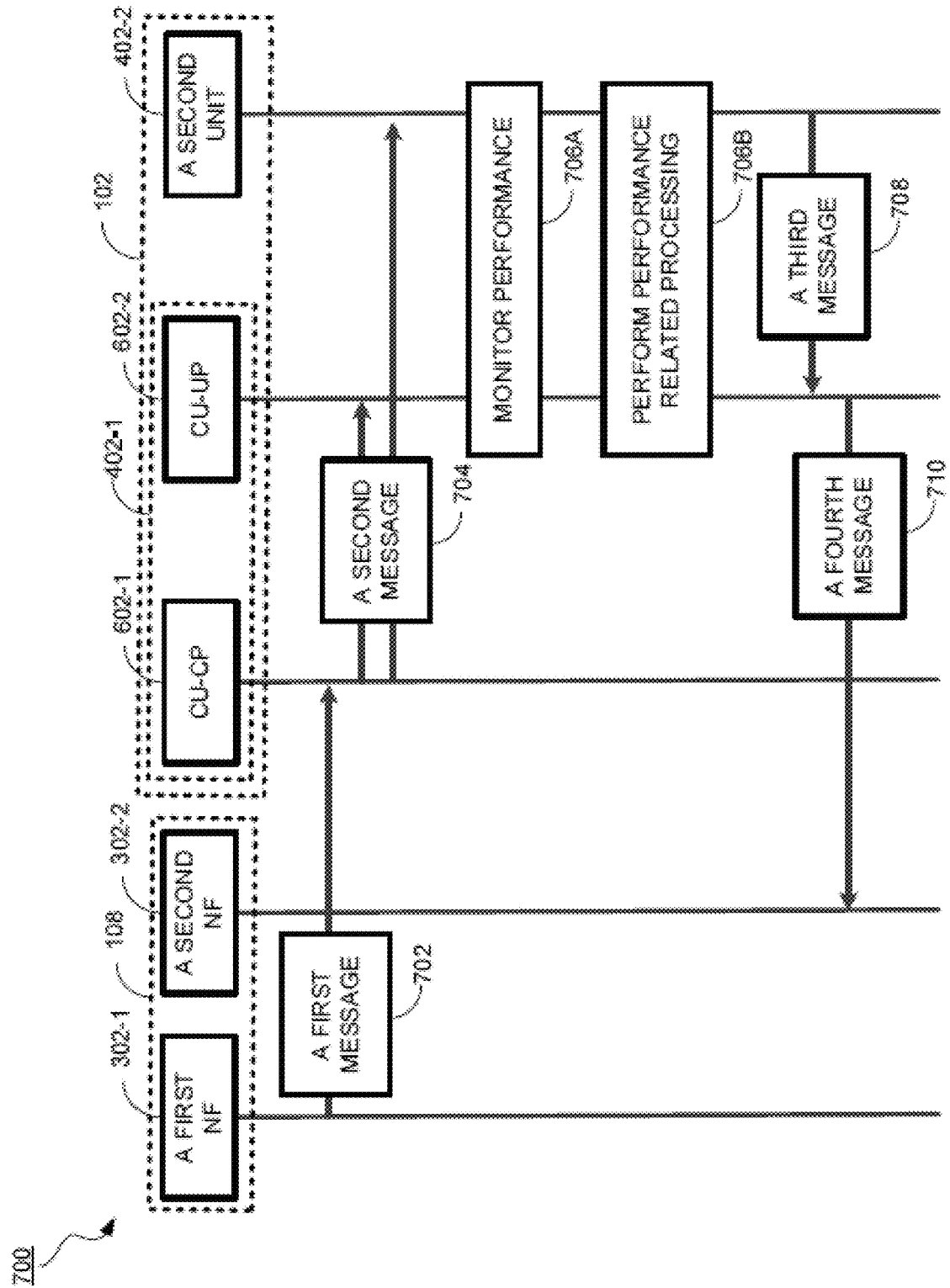
FIG. 7 illustrates a method for performing a performance monitoring in a wireless communication system, in accordance with some embodiments of the present disclosure.

FIG. 7 illustrates a method 700 for performing a performance monitoring in a wireless communication system, in accordance with some embodiments of the present disclosure. It is understood that additional operations may be provided before, during, and after the method 700 of FIG. 7, and that some operations may be omitted or reordered. The communication system in the illustrated embodiment comprises a CN 108 and a BS 102. In the illustrated embodiment, the CN 108 comprises a first NF entity 302-1, and a second NF entity 302-2. In some embodiments, the first NF entity 302-1 is AMF of the CN 108 and the second NF entity 302-2 is UPF of the CN 108. In the illustrated embodiment, the BS 102 comprises a first unit 402-1, and a second unit 402-2. In some embodiments, the first unit 402-1 is a CU and a second unit 402-2 is a DU. In the illustrated embodiments, the first unit 402-1 is further split into a CU-Control Plane (CU-CP) 602-1 and a CU-User Plane (CU-UP) 602-2. FIG. 7 is for illustration purposes and is not intend to be limiting. It should be noted that that any numbers of BS 102 and CU 402-1 can be used, which is within the scope of this invention.

The method 700 starts with operation 502 in which a first message is received by the CU-CP 602-1 of the first unit 402-1 of the BS 102 from the first NF entity 302-1 of the CN 108 according to some embodiments. In some embodiments, the first message is transmitted on a NG interface. In some embodiments, the first message is one of the following: an INITIAL CONTEXT SETUP REQUEST message, a Protocol Data Unit (PDU) SESSION RESOURCE SETUP REQUEST message, and a PDU SESSION RESOURCE MODIFY REQUEST message. In some embodiments, the first message comprises performance control information for at least one Quality of Service (QoS) flow which requires performance control. In some embodiments, the performance control information comprises at least one of the following: a packet delay budget, a first indicator, a second indicator, and a third indicator. In some embodiments, the packet delay budget is a delay time for transmitting data packets at a corresponding interface between two corresponding nodes. In some embodiments, the first indicator is an indicator for reporting a performance situation when an actual packet delay of a corresponding packet is greater than the packet delay budget. In some embodiments, the second indicator is an indicator to drop the corresponding packet if the actual packet delay is greater than the packet delay budget. In some embodiments, the third indicator is configured to indicate an interface between two corresponding nodes for performing the performance control. For example, the third indicator has an enumeration with a value of "Uu interface".

The method 700 continues with operation 704 in which a second message is received by the second unit 402-2 of the BS 102 and the CU-UP 602-2 of the first unit 402-1 of the BS 102 from the CU-CP 602-1 of the first unit 402-1 of the BS 102 according to some embodiments. In some embodiments, the second message is one of the following through an FI interface: a UE CONTEXT SETUP REQUEST message, and a UE CONTEXT MODIFICATION REQUEST message. In some other embodiments, the second message is one of the following through an E1 interface: a BEARER CONTEXT SETUP REQUEST message and a BEARER CONTEXT MODIFICATION REQUEST message. In some embodiments, the second message comprises the performance control information received by the CU-CP 602-1 of the first unit 402-1 of the BS 102 from the first NF entity 302-1 of the CN 108.

The method 700 continues with operation 706A in which performance is monitored by the BS 102 according to some embodiments. In some embodiments, the operation 706A is performed by the CU-UP 602-2 of the first unit 402-1 and the second unit 402-2 of the BS 102. In some embodiments, the performance is monitored according to the performance control information in the second message. For example, the data packet delay between the BS 102 and a UE (not shown) can be monitored by the second unit 402-2. For another example, the bit rate of QoS flows can be monitored by the CU-UP 602-2 of the first unit 402-1.

In some embodiments, the method 700 may further continue with operation 706B in which performance-related processing is performed by the BS 102 according to some embodiments. In some embodiments, the operation 706B is performed by the CU-UP 602-2 of the first unit 402-1 and the second unit 402-2 of the BS 102. In some embodiments, when the second indicator has a value indicating to drop the corresponding packet with an actual packet delay greater than the packet delay budget, when the third indicator has a value of "RAN part", the CU-UP 602-2 of first unit 402-1 of the BS 102 can drop the corresponding packet when the actual packet delay is greater than the packet delay budget. In this case, the actual packet delay comprises the following: a processing delay in the CU-UP 602-2 of the first unit 402-1 of the BS 102, a transmission delay at the F1 interface, and a processing delay in the second unit 402-2 of the BS 102, a transmission delay at the Uu interface, and a processing delay in the UE (not shown); and the value of "RAN part" of the third indicator indicates all the corresponding interfaces and nodes in the BS 102.

The method 700 continues with operation 708 in which a third message is transmitted from the second unit 402-2 of the BS 102 to the CU-UP 602-2 of the first unit 402-1 of the BS 102 according to some embodiments. In some embodiments, the third message is carried in a frame header of a data packet through the F1-U interface. In some embodiments, the third message comprises a first performance report of the corresponding QoS flow. In some embodiments, the first performance report comprises at least one performance situation determined by the second unit 402-2, wherein the at least one performance situation comprises information of when an actual packet delay of a corresponding QoS flow at corresponding interfaces and/or corresponding nodes.

The method 700 continues with operation 710 in which a fourth message is transmitted from the CU-UP 602-2 of the first unit 402-1 of the BS 102 to the second NF entity 302-2 of the CN 108 according to some embodiments. In some embodiments, the fourth message is carried in the frame header of the data packet. In some embodiments, the fourth message is transmitted through a NG-U interface. In some embodiments, the fourth message comprises a second performance report, wherein the second performance report comprises at least one performance situation determined by the CU-UP 602-2 of the first unit 402-1. In some embodiments, the fourth message further comprises the first performance report received in the third message. In some embodiments, the first performance report and the second performance report are carried in a frame header of a data packet. In some embodiments, a format of the frame header comprises at least one bit and each of the at least one bit indicates a performance situation. For example, when a value of a bit in the frame header is 1, the actual packet delay of the corresponding QoS flow at the corresponding interfaces and/or corresponding nodes is greater than the packet delay budget; and when a value of the bit of the frame header is 0, the actual packet delay of the corresponding QoS flow at the corresponding interfaces and/or corresponding nodes is less than the configured packet delay budget.

In some embodiments, the performance can be further adjusted by the CN according to the performance report received from the BS 102. For example, the CN 108 can perform one of the following: decrease a QoS requirement of the corresponding QoS flow, increase a priority of the corresponding QoS flow, and release the corresponding QoS flow.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for performing a performance monitoring by a wireless communication node of a wireless communication system, comprising:
receiving a first message from a core network of the wireless communication system; and
performing a performance monitoring according to the first message, wherein:
the first message comprises performance control information of at least one corresponding Quality of Service (QOS) flow;
the performance control information comprises: a packet delay budget, and at least one indicator; and
the at least one indicator comprises at least one of the following: a first indicator for instructing the wireless communication node to report a performance situation when an actual packet delay is greater than the packet delay budget, or a second indicator instructing the wireless communication node to drop data packets in the at least one corresponding QoS flow, wherein the performance situation comprises whether the actual packet delay of the corresponding QoS flow is greater than the packet delay budget.

2. The method of claim 1, wherein the first message is received on a control plane (CP) of a centralized unit (CU) of the wireless communication node through an NG interface.

3. The method of claim 1, wherein the first message is received from an Access Mobility Function (AMF) of the core network.

4. The method of claim 1, wherein the performance monitoring is performed by at least one of the following of the wireless communication node: a CU or a Distributed Unit (DU).

5. The method of claim 1, further comprising:
transmitting a second message to the core network of the wireless communication system,
wherein the second message comprises a performance report of the at least one corresponding QoS flow, and wherein the performance report is determined according to the at least one indicator.

6. The method of claim 5, wherein the second message is transmitted from one of:
a user plane (UP) of a CU of the wireless communication node to a User Plane Function (UPF) of the core network; or a control plane (CP) of the CU of the wireless communication node to an AMF of the core network.

7. The method of claim 5, wherein the performance report comprises at least one of the following: a first report from the CU or a second report from a distributed unit (DU) of the wireless communication node, the method further comprising:
performing a performance-related processing according to the at least one indicator by at least one of the following of the wireless communication node: a CU or a DU.

8. A method for configuring a performance monitoring by a core network of a wireless communication system, comprising:
transmitting a first message to a wireless communication node of the wireless communication system, wherein:
the first message comprises performance control information of at least one corresponding Quality of Service (QOS) flow;
the performance control information comprises: a packet delay budget, and at least one indicator; and
the at least one indicator comprises at least one of the following: a first indicator for instructing the wireless communication node to report a performance situation when an actual packet delay is greater than the packet delay budget, or a second indicator instructing the wireless communication node to drop data packets in the at least one corresponding QoS flow, wherein the performance situation comprises whether the actual packet delay of the corresponding QoS flow is greater than the packet delay budget.

9. The method of claim 8, wherein the first message is transmitted to a control plane (CP) of a centralized unit (CU) of the wireless communication node through an NG interface.

10. The method of claim 8, wherein the first message is transmitted by an Access Mobility Function (AMF) of the core network.

11. The method of claim 8, wherein the performance monitoring is performed by at least one of the following of the wireless communication node: a CU or a Distributed Unit (DU).

12. The method of claim 8, further comprising:
receiving a second message from the wireless communication node of the wireless communication system,
wherein the second message comprises a performance report of the at least one corresponding QoS flow, and wherein the performance report is determined according to the at least one indicator.

13. The method of claim 12, wherein:
the second message is received from a user plane (UP) of a CU of the wireless communication node by a User Plane Function (UPF) of the core network; or the second message is received from a control plane (CP) of the CU of the wireless communication node by an AMF of the core network.

14. The method of claim 12, wherein the performance report comprises at least one of the following: a first report from the CU or a second report from a distributed unit (DU) of the wireless communication node, and wherein the at least one indicator is configured for performing a performance-related processing by at least one of the following of the wireless communication node: a CU or a DU.

15. A wireless communication node of a wireless communication system, comprising a memory for storing computer instructions and a processor in communication with the memory, wherein, when the processor executes the computer instructions, the processor is configured to cause the wireless communication node to:
receive a first message from a core network of the wireless communication system; and
perform a performance monitoring according to the first message, wherein:
the first message comprises performance control information of at least one corresponding Quality of Service (QOS) flow;
the performance control information comprises: a packet delay budget, and at least one indicator; and
the at least one indicator comprises at least one of the following: a first indicator for instructing the wireless communication node to report a performance situation when an actual packet delay is greater than the packet delay budget, or a second indicator instructing the wireless communication node to drop data packets in the at least one corresponding QoS flow, wherein the performance situation comprises whether the actual packet delay of the corresponding QoS flow is greater than the packet delay budget.

16. The wireless communication node of claim 15, wherein the first message is received on a control plane (CP) of a centralized unit (CU) of the wireless communication node.

17. The wireless communication node of claim 15, wherein the first message is received from an Access Mobility Function (AMF) of the core network.

18. The wireless communication node of claim 15, wherein, when the processor executes the computer instructions, the processor is configured to further cause the wireless communication node to:
transmit a second message to the core network of the wireless communication system,
wherein the second message comprises a performance report of the at least one corresponding QoS flow, and wherein the performance report is determined according to the at least one indicator.

* * * * *